(12) United States Patent
Eaton (10) Patent No.: US 7,193,812 B2
(45) Date of Patent: Mar. 20, 2007

(54) RECORDING HEAD COMPENSATION FOR TAPE SHRINKAGE AND EXPANSION

(75) Inventor: James Howard Eaton, Morgan Hill, CA (US)

(73) Assignee: International Business Machines Corporation, Armonk, NY (US)

( * ) Notice: Subject to any disclaimer, the term of this patent is extended or adjusted under 35 U.S.C. 154(b) by 527 days.

(21) Appl. No.: 10/627,079

(22) Filed: Jul. 25, 2003

(65) Prior Publication Data

US 2005/0018349 A1  Jan. 27, 2005

(51) Int. Cl.
*G11B 5/55* (2006.01)
*G11B 5/585* (2006.01)

(52) U.S. Cl. .................. 360/121; 360/77.12
(58) Field of Classification Search ............... 360/121, 360/129, 77.12
See application file for complete search history.

(56) References Cited

U.S. PATENT DOCUMENTS

| | | | | |
|---|---|---|---|---|
| 4,414,596 A | * | 11/1983 | Nakamichi | 360/129 |
| 4,903,150 A | | 2/1990 | Juso et al. | 360/77.12 |
| 5,027,245 A | * | 6/1991 | Nagata et al. | 360/121 |
| 5,210,667 A | * | 5/1993 | Zammit | 360/316 |
| 5,307,217 A | * | 4/1994 | Saliba | 360/76 |
| 5,321,564 A | * | 6/1994 | Takahashi et al. | 360/77.04 |
| 5,602,703 A | * | 2/1997 | Moore et al. | 360/121 |
| 5,617,269 A | * | 4/1997 | Gordenker et al. | 360/77.12 |
| 5,629,813 A | * | 5/1997 | Baca et al. | 360/77.12 |
| 5,982,711 A | | 11/1999 | Knowles et al. | 368/77.12 |
| 6,005,751 A | * | 12/1999 | Kazmierczak et al. | 360/244 |
| 6,014,291 A | * | 1/2000 | Watanabe et al. | 360/121 |
| 6,222,698 B1 | * | 4/2001 | Barndt et al. | 360/76 |
| 6,322,015 B1 | * | 11/2001 | Trabert | 242/341 |
| 6,650,496 B2 | * | 11/2003 | Nozieres et al. | 360/63 |

FOREIGN PATENT DOCUMENTS

JP  08216440  3/1998

\* cited by examiner

*Primary Examiner*—Brian E. Miller
(74) *Attorney, Agent, or Firm*—Kunzler & Associates (57) ABSTRACT

A recording head to simultaneously read or write data to and from a plurality of tracks on magnetic tape, while compensating for shrinkage or expansion caused by moisture, temperature, creep caused by tension in the tape, creep caused by dimensional instability of the tape, as well as other causes. A recording head in accordance with the invention includes a leading module and a trailing module. In order to accommodate fluctuation in tape dimensions due to expansion or shrinkage, the leading and trailing modules may be offset with respect to one another. By offsetting one module with respect to the other, selected read and write elements from one module may more closely align with certain tracks of an expanded or shrunk tape, while other read and write elements from the other module may more closely align with other tracks on the tape.

21 Claims, 9 Drawing Sheets

RECORDING HEAD COMPENSATION FOR TAPE SHRINKAGE AND EXPANSION

BACKGROUND OF THE INVENTION

1. The Field of the Invention

This invention relates to tape recording heads, and more particularly to tape recording heads configured to compensate for magnetic tape shrinkage and expansion.

2. The Relevant Art

Magnetic recording has played an important role in the electronic age for permanently storing and retrieving data. Within the field of magnetic recording, few media technologies have been used as extensively as magnetic tape. Magnetic tape has been widely used to store music, video, as well as digital data processed by computers. However, as other types of magnetic media, such as hard drives, have become more economical and capable of storing larger quantities of data, reliance on magnetic tape for data storage has declined.

Part of this decline may be attributed to perceptions of lower reliability of tape, or to slower storage or retrieval of data therefrom. Reliability concerns originate in part from the fact that magnetic tape is prone to shrink and expand due to changes in environmental temperature, humidity, creep caused by tension on the tape, or creep caused by the tendency of an extruded material, such as tape, to return to a previous form.

Nevertheless, using tape for data storage still provides significant advantages, including its relatively low cost and large storage capacity. Very few other technologies offer the combined low cost and high capacity advantage of tape. While other technologies may offer various advantages with respect to tape in specific areas, overall, none of these technologies compare to tape in addressing customer needs for low cost and storage capacity.

As is customary with other storage mediums, significant effort is directed to storing larger quantities of data on smaller areas of the medium (e.g. increasing storage density). Moreover, additional effort is directed to storing and retrieving the data faster and more efficiently. As data is stored on tape in increased density, one issue becomes reliably writing and retrieving data stored on smaller and smaller areas of the tape.

For example, in order to accurately store and retrieve data from tape, data recording and reading heads need to be accurately positioned with respect to the tape surface. The complexity of this task is compounded by possible changes in a tape's dimensions. Even slight amounts of tape distortion may make the retrieval of written information difficult if not impossible.

Problems incurred by the dimensional instability of tape and its limitations with respect to track density in multi-read element systems is well known in the art. One proposed solution is to place the elements of a multi-element head closer together. However, existing heads are as close together as current technology allows.

Another approach is to skew a recording head with respect to the magnetic tape such that rotation of the head varies the effective span of the head over tracks on the tape. However, skewing the head causes problems when reading the data. Moreover, due to the "cosine" characteristics of skewing the head, a relatively large skew is required to significantly affect the span of the head over the tape.

Thus, in accordance with the previously stated concerns, apparatus and methods are needed to more accurately store and retrieve data from magnetic tape using recording and reading heads. What is further needed are apparatus and method to accurately store and retrieve data while compensating for expansion or shrinkage of tape due to humidity, temperature, or creep.

Accordingly, it would be an advance in the art to provide a recording head that could accurately store and retrieve data on tape even when the tape has changed dimensions due to humidity, temperature, creep, or other causes.

SUMMARY OF THE INVENTION

Accordingly, an apparatus in accordance with the present invention provides a recording head to simultaneously read or write data to and from a plurality of tracks on magnetic tape, while compensating for shrinkage or expansion caused by moisture, temperature, creep caused by tension in the tape, creep caused by dimensional instability of the tape, as well as other causes. In one embodiment, a recording head in accordance with the invention includes a leading module and a trailing module. A leading module refers to a module that initially reads or writes data to or from the tape as it is translated past the head. A trailing module refers to a module that reads or writes data to or from the tape after it has passed the leading module.

In certain embodiments, each of the leading and trailing modules includes a plurality of read and write elements located linearly or substantially linearly along the lengths thereof. "Read elements" refer to components or devices that are effective to read data from a magnetic tape. Likewise, "write elements" refer to components or devices that are effective to write data to magnetic tape.

In certain embodiments, each of the leading and trailing modules include read and write elements located in a "piggyback" configuration, wherein corresponding read and write elements are located on the same module and are substantially aligned with one another. In another embodiment, each of the leading and trailing modules include read and write elements that are "interleaved," meaning that read and write elements are placed at intervals along the length of each of the modules, and in an alternating manner.

In selected embodiments, such as in a "piggyback" configuration, the leading and trailing modules are virtually identical modules having read and write elements that mirror the other's read and write elements. In other embodiments, such as in an "interleaved" configuration, the leading and trailing modules have read and write elements that oppose one another. That is, a read element located on the trailing module is substantially aligned with a write element on the leading module, and vice versa.

In order to accommodate fluctuation in tape dimensions due to expansion or shrinkage, the leading and trailing modules are offset with respect to one another. That is, a leading module is offset, in a direction parallel to the length of the leading module, from the trailing module. By offsetting one module with respect to the other, selected read and write elements from one module more closely align with certain tracks of an expanded or shrunk tape, while other read and write elements from the other module more closely align with other tracks on the tape.

In selected embodiments, the trailing module is fixed with respect to the leading module. In other embodiments, the trailing module is rigidly attached to the leading module using glue, welding, or other attachment means.

In certain embodiments, read elements from a trailing module are used to read and verify data that is written by write elements on a leading module. Likewise, in the reverse direction, the leading and trailing modules are interchanged and again read elements from the new trailing module are used to read and verify data that is written by write elements on a new leading module. By using read elements on one module to verify data written by elements on the other module, interference between read and write elements on the same module may be avoided.

The leading and trailing modules also include servo readers to read servo bands on the magnetic tape. The servo readers align the recording head with the magnetic tape such that read and write elements are aligned with selected data tracks. In cases where a magnetic tape has expanded or shrunk, the servo readers may serve to measure the width of the tape in order to make necessary adjustments to the position of the recording head.

Misalignment is due to differences in the width of the tape from the time it is written to the time it is read. At the time data is written, two servo readers on either side of the data band may measure the width of the tape. This width may be recorded along with data onto the tape. When the tape is read, the difference in tape width since data was last written may be calculated. This calculation may be used to select read and write elements on the leading and trailing modules that are most aligned with data tracks on the tape. In a "read back" mode, read elements from either the leading or trailing modules can be used without interference with write elements because the trailing module is not needed to verify data that was just written.

In selected embodiments, if it is determined that a tape is substantially unaltered (e.g. not expanded or shrunk), all of the read elements from a single module (e.g. either the leading or trailing module) are used to read data from the tape. If it is determined that the tape has expanded, a portion of the read elements from one module are used to read certain data tracks, while a portion of the read elements from the other module are used to read other data tracks. Likewise, if it is determined that the tape is shrunk since data was last written, a portion of the read elements from one module are used to read certain data tracks, while a portion of the read elements from the other module are used to read other data tracks.

In certain embodiments, a control module is operably connected to the servo readers and the read and write elements to effectively position the elements over the data tracks, and to determine which read and write elements of each module will be used to read and write data. In selected embodiments, each module is effectively divided up into halves, each half including half of the read and write elements of the respective module.

The recording head may be characterized by three modes: a first mode characterized by half of the leading module and half of the trailing module to read data from expanded tape; a second mode characterized by the other half of the leading module and the other half of the trailing module to read data from a shrunken tape; and halves from the same module (trailing or leading) when tape is substantially unaltered.

In another aspect of the present invention, a method for simultaneously reading and writing data to and from a plurality of tracks on magnetic tape, while compensating for shrinkage or expansion of the magnetic tape, includes providing a leading and trailing module comprising a plurality of read and write elements located at spaced intervals along the lengths thereof. The method further includes offsetting the trailing module with respect to the leading module to compensate for the expansion or shrinkage.

If the tape has expanded or shrunk, a method in accordance with the invention includes substantially aligning selected read and write elements from the leading module with selected data tracks on the tape, and substantially aligning selected read and write elements from the trailing module with other selected data tracks on the tape. In certain embodiments, half of trailing module and half of the leading module is used to read data tracks on a tape in an expanded or shrunken state.

The method may further include fixing the trailing module with respect to the leading module. In certain embodiments, the method includes rigidly attaching the trailing module to the leading module.

In another aspect of the present invention, a system for simultaneously reading and writing data to and from a plurality of tracks on magnetic tape, while compensating for shrinkage or expansion of the magnetic tape, includes a magnetic medium, such as magnetic tape, containing a plurality of data tracks located at spaced intervals thereon. The system further includes a data storage device for storing data on the magnetic tape. The data storage device includes a recording head for reading and writing to and from the data tracks on the tape.

The recording head includes a leading module comprising a plurality of read or write elements located at spaced intervals along the length of the leading module, and a trailing module comprising a plurality of read or write elements located at spaced intervals along the length thereof. The trailing module is offset with respect to the leading module in order to align selected read or write elements from the trailing module with selected data tracks on the magnetic tape, and to align selected read or write elements from the leading module with other selected data tracks on the magnetic tape.

BRIEF DESCRIPTION OF THE DRAWINGS

The foregoing and other features of the present invention will become more fully apparent from the following description, taken in conjunction with the accompanying drawings. Understanding that these drawings depict only typical embodiments in accordance with the invention and are, therefore, not to be considered limiting of its scope, the invention will be described with additional specificity and detail through use of the accompanying drawings in which.

DETAILED DESCRIPTION OF THE INVENTION

Various functional units described in this specification have been labeled as modules, in order to more particularly emphasize their implementation independence. For example, a module may be implemented as a hardware circuit comprising custom VLSI circuits or gate arrays, off-the-shelf semiconductors such as logic chips, transistors, or other discrete components. A module may also be implemented in programmable hardware devices such as field programmable gate arrays, programmable array logic, programmable logic devices or the like.

Modules may also be implemented in software for execution by various types of processors. An identified module of executable code may, for instance, comprise one or more physical or logical blocks of computer instructions that may, for instance, be organized as an object, procedure, or function. Nevertheless, the executables of an identified module need not be physically located together, but may comprise disparate instructions stored in different locations which, when joined logically together, comprise the module and achieve the stated purpose for the module.

Indeed, a module of executable code could be a single instruction, or many instructions, and may even be distributed over several different code segments, among different programs, and across several memory devices. Similarly, operational data may be identified and illustrated herein within modules, and may be embodied in any suitable form and organized within any suitable type of data structure. The operational data may be collected as a single data set, or may be distributed over different locations including over different storage devices, and may exist, at least partially, merely as electronic signals on a system or network.

Figure 1A:
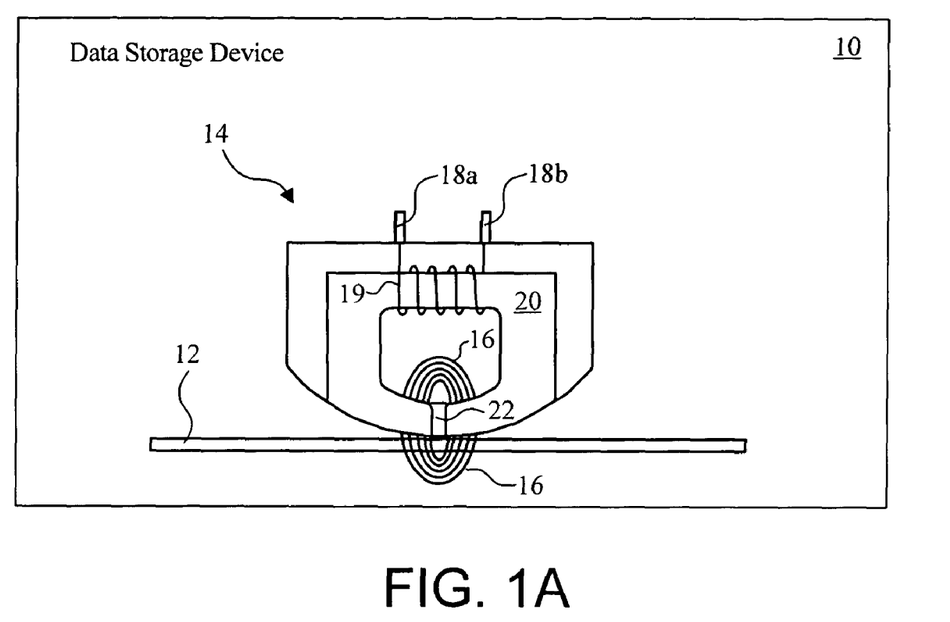
FIG. 1A is a schematic block diagram illustrating one embodiment of a data storage device containing a recording head used to write or read data to or from a magnetic medium, such as magnetic tape.

Referring to FIG. 1A, a data storage device 10 used to store data on magnetic tape 12, or some other medium 12, typically uses one or more recording heads 14. In certain embodiments, a recording head 14 functions by creating a magnetic field 16 or magnetic flux 16 that magnetizes a magnetic material on the surface of the tape 12, such as iron ferrite or some other ferromagnetic material. Ferromagnetic materials refer to elements or materials that, when exposed to a magnetic field, become magnetized themselves. By selectively magnetizing portions of the tape 12, data is encoded or stored. Moreover, by re-exposing the tape to a magnetic field 16, data may be rewritten with other data, or erased entirely. Since portions of the tape 12 become magnetized when exposed to a magnetic field, a head 14 may also be used to read data from the tape 12 when translated over the surface thereof.

For example, a ferrite core recording head 14 may be used to illustrate the function of a recording head 14. Various types of recording heads 14 may be used in accordance with the present invention, and a ferrite core recording head 14 is simply presented by way of example and not limitation. One or more terminals 18a, 18b receive a data signal carrying data for storage on the tape 12. The terminals 18 are connected to a wire 19 or conductor 19 coiled around a ferrite core 20.

Current is transmitted through the coil 19, thereby creating a magnetic flux traveling through the coil 19. This flux travels through the iron core 20 and is retained therein until it reaches a gap 22 in the core 20. As magnetic flux reaches the gap 22, the flux creates a fringe pattern 16 as it spans the gap 22. The fringe pattern 16 is used to magnetize ferromagnetic material on the surface of the tape 12. As previously stated, there are very many types of recording heads 14 available, all within the scope of the present invention, and the illustrated example is simply presented by way of example.

Figure 1B:
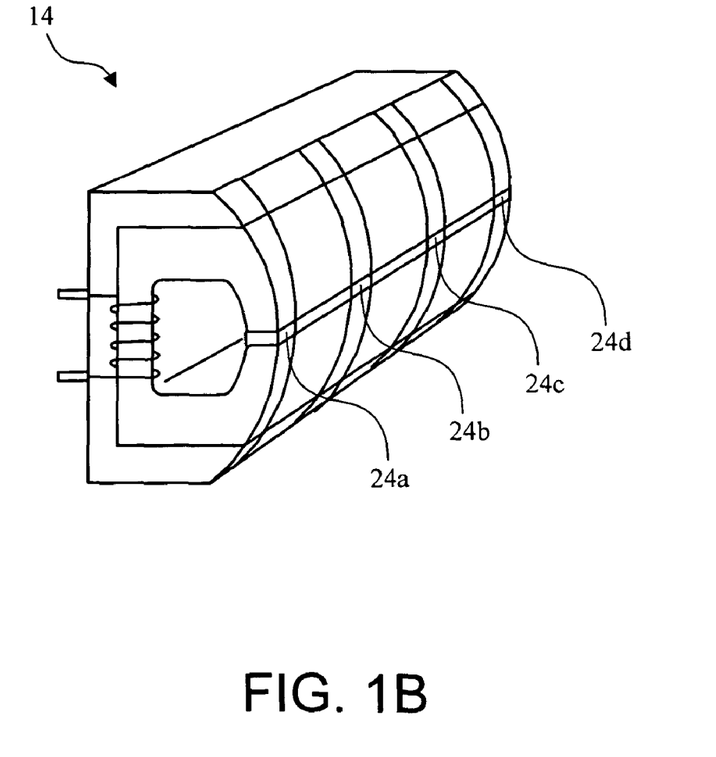
FIG. 1B is a perspective view illustrating one embodiment of a recording head configured to read or write multiple data tracks onto a magnetic medium.

Referring to FIG. 1B, in selected embodiments, a recording head 14 is a multi-track recording head 14. That is, a recording head 14 may read or write several tracks of data to a tape 12 simultaneously. For example, a multi-track recording head 14 includes multiple read or write elements 24a–d. Each of the read and write elements 24a–d may be operably connected to separate terminals 18 (not shown), may be operated independently, and may read or write distinct or redundant information to the tape 12.

Figure 2:
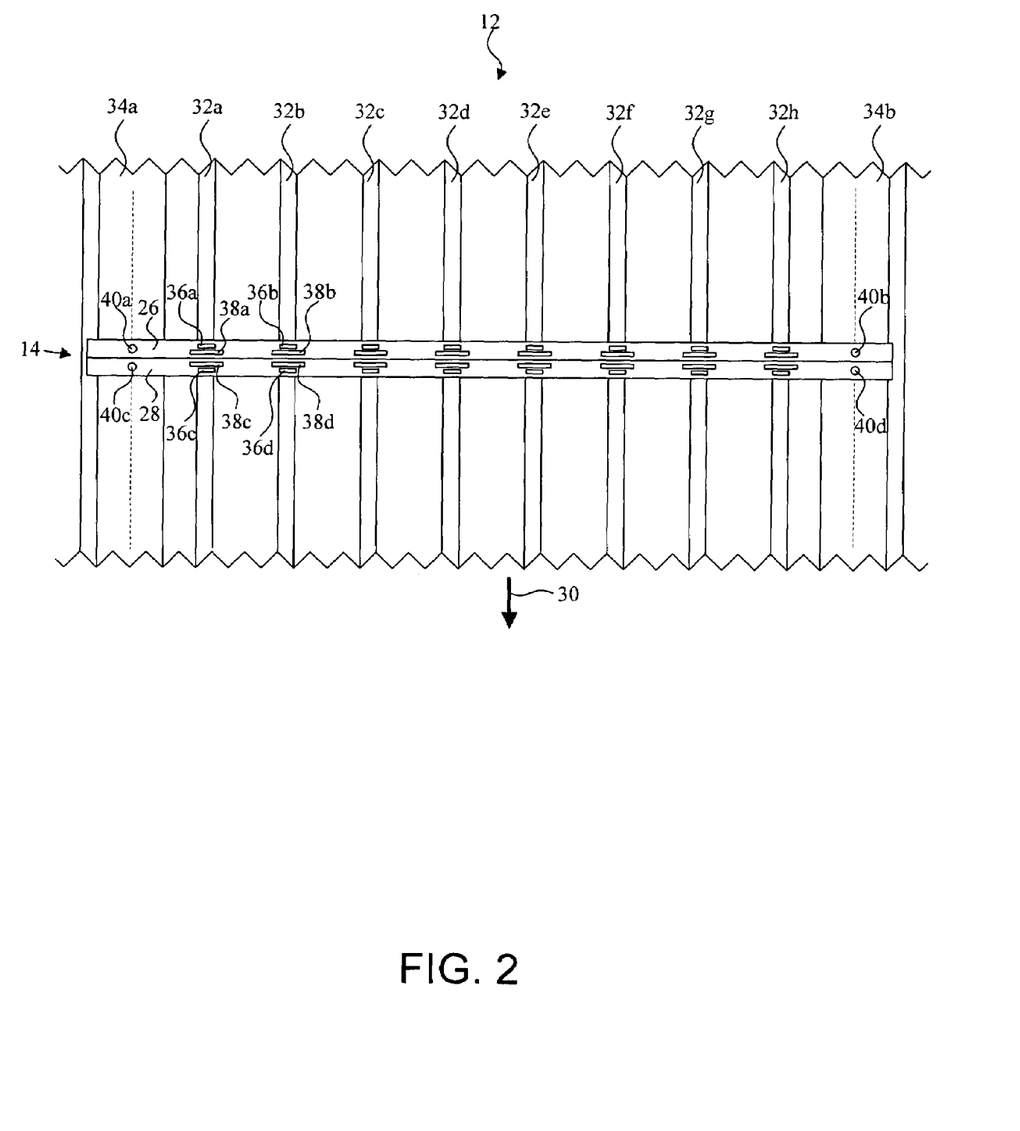
FIG. 2 is a schematic block diagram illustrating one embodiment of a recording head having a leading and trailing module, each module including servo readers for positioning the recording head with respect to a magnetic tape, and various read and write elements to read and write data to the magnetic tape.

Referring to FIG. 2, a multi-track recording head 14 in accordance with the invention includes a leading module 26 and a trailing module 28. For example if a tape 12 moves in a direction 30, a leading module 26 is defined as the first module 26 to read or write to the tape 12. Likewise, the trailing module 28 reads or writes to the tape 12 after the leading module 26.

The tape 12 includes various tracks containing data and other tracks for properly positioning the head 14 with respect to the tape 12. For example, the tape 12 includes a plurality of data tracks 32a–h to store data. Likewise, the tape 12 may include servo tracks 34a, 34b containing data used for accurately positioning the recording head 14 with respect to the tape 12 and for measuring shrinkage or expansion of the tape 12.

Each of the leading and trailing modules 26, 28 includes a plurality of read elements 36a–d and a plurality of write elements 38a–d. The read and write elements 36, 38 are used to read and write data to and from the data tracks 32. The read elements 36 are used to read data that is stored on the tape 12, or are also used to immediately verify data that has been written to the tape 12 by the write elements 38. In certain embodiments, the write elements 38 are wider than the read elements 36. This helps ensure that a written track 32 is wide enough for a read element 36 to read the track 32 without reading data in adjacent tracks 32, thereby corrupting data or incurring errors. In selected embodiments, the write elements 38 are wider than the read elements 36 and are offset somewhat from centerline to centerline. This is typical of "shingled" writing used to provide compatibility with previous tape generations.

In certain embodiments, read elements 36 of the trailing module 28 verify data written by write elements 38 of the leading module 26. Likewise, if the tape 12 is reversed in direction (opposite to direction 30), then the trailing module 28 becomes the leading module 26, and the leading module 26 becomes the trailing module 28. Thus, in this scenario, the read elements on the module 26 would be used to verify data written by write elements 38 on the other module 28.

The recording head 14 also includes servo readers 40a–d. The servo readers 40a–d are used to align the recording head 14 with respect to the tape 12 by detecting data or information contained within the servo tracks 34a, 34b. In certain embodiments, the servo readers 40 are substantially aligned with the center of the servo tracks 34a, 34b.

The leading and trailing modules 26, 28 may be fixed with respect to one another in order to maintain alignment of read and write elements 36, 38 contained thereon. Nevertheless, the recording head 14 as a whole may be translated with respect to the tape 12 in order to align read and write elements 36, 38 with the data tracks 32. In certain embodiments, the leading and trailing modules 26, 28 are glued or welded together, or are constructed from a single piece of material.

Figure 3A:
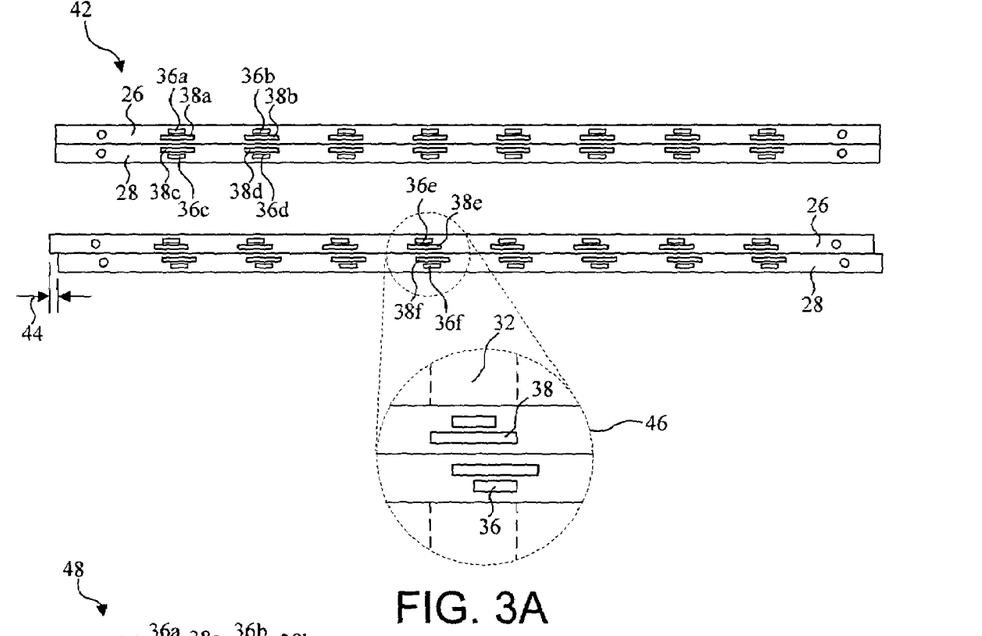
FIG. 3A is a schematic block diagram illustrating one embodiment of leading and trailing modules having read and write elements in a "piggyback" configuration, and an exploded view of the alignment of read and write elements when the leading and trailing modules are offset with respect to one another.

Referring to FIG. 3A, the leading and trailing modules 26, 28 may be provided in various configurations. For example, in selected embodiments, the read and write elements 36a–d, 38a–d are provided in a "piggyback" configuration 42. That is, read elements 36 and write elements 38 are substantially aligned with one another with respect to a tape 12 passing thereby. In this configuration 42, data written by a write element 38a, on a leading module 26, may be read by a read element 36c on the trailing module 28. Likewise, if a tape 12 is traveling in the opposite direction, data written by a write element 38c, on a leading module 28, may be read by a read element 36a on a trailing module 26.

As described previously, tape 12 may shrink or expand due to temperature, humidity, creep, and other causes. In such cases, it may be advantageous to offset 44 the leading and trailing modules 26, 28 by a select distance 44. This offset 44 enables more precise centering of read and write elements 36, 38 over the data tracks 32. Selected read and write elements 36, 38 are used from one module 26, 28, while other read and write elements 36, 38 are used from the other module 26, 28.

Referring to the enlarged view 46, the offset 44 may be selected such that a read element 36 on the trailing module 28 still accurately reads data written by a write element 38 on the leading module 26. For example, if a write element 38 writes data to a track 32, the read element 36 is still aligned within the boundaries of the track 32, thereby enabling a successful read.

Figure 3B:
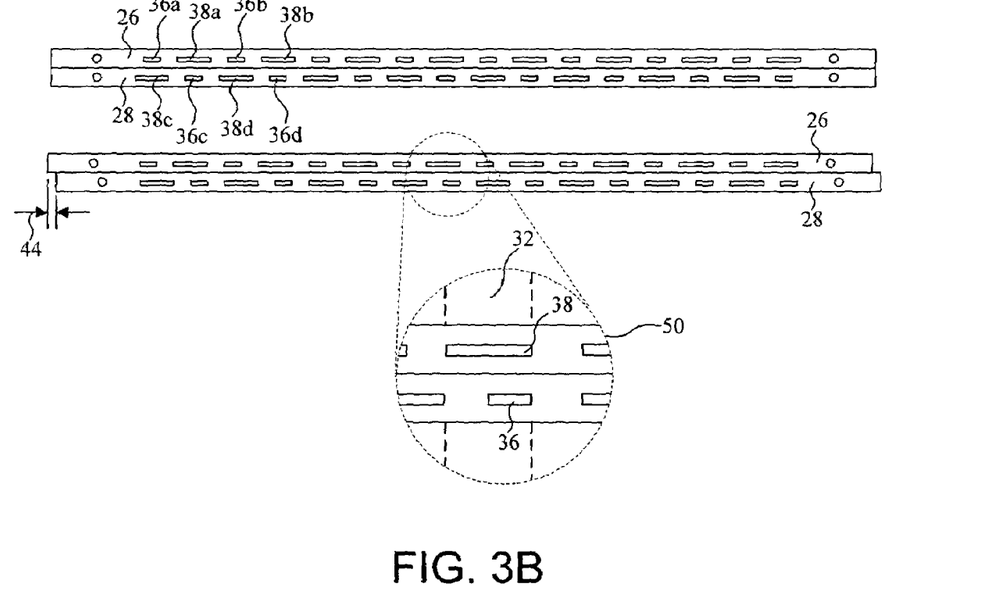
FIG. 3B is a schematic block diagram illustrating one embodiment of leading and trailing modules having read and write elements in an "interleaved" configuration, and an exploded view of the alignment of read and write elements when the leading and trailing modules are offset with respect to one another.

Referring to FIG. 3B, in another embodiment, the read and write elements 36a–d, 38a–d are provided in an "interleaved" configuration 48. That is, read elements 36 and write elements 38 are alternated along the length of each of the modules 26, 28. A leading module 26 is an inverted image of the trailing module 28, meaning that a read element 36a on the leading module 26 is aligned with a write element 38c on a trailing module, and vice versa. Data written by a write element 38a, on a leading module 26, may be read by a read element 36c on the trailing module 28. Likewise, if a tape 12 is traveling in the opposite direction, data written by a write element 38c, on a leading module 28, may be read by a read element 36a on a trailing module 26.

As in the previous example illustrated in FIG. 3A, the leading and trailing modules 26, 28 are offset by a select distance 44 to enable more precise centering of read and write elements 36, 38 over the data tracks 32 to compensate for tape 12 shrinkage or expansion. Select read and write elements 36, 38 are used from one module 26, 28, while other read and write elements 36, 38 are used from the other module 36, 38.

Referring to the enlarged view 50, the offset 44 may be selected such that a read element 36 on the trailing module 28 still accurately reads data written by a write element 38 on the leading module 26. For example, if a write element 38 writes data to a track 32, the read element 36 is still aligned within the boundaries of the track 32, thereby enabling a successful read operation.

Figure 4:
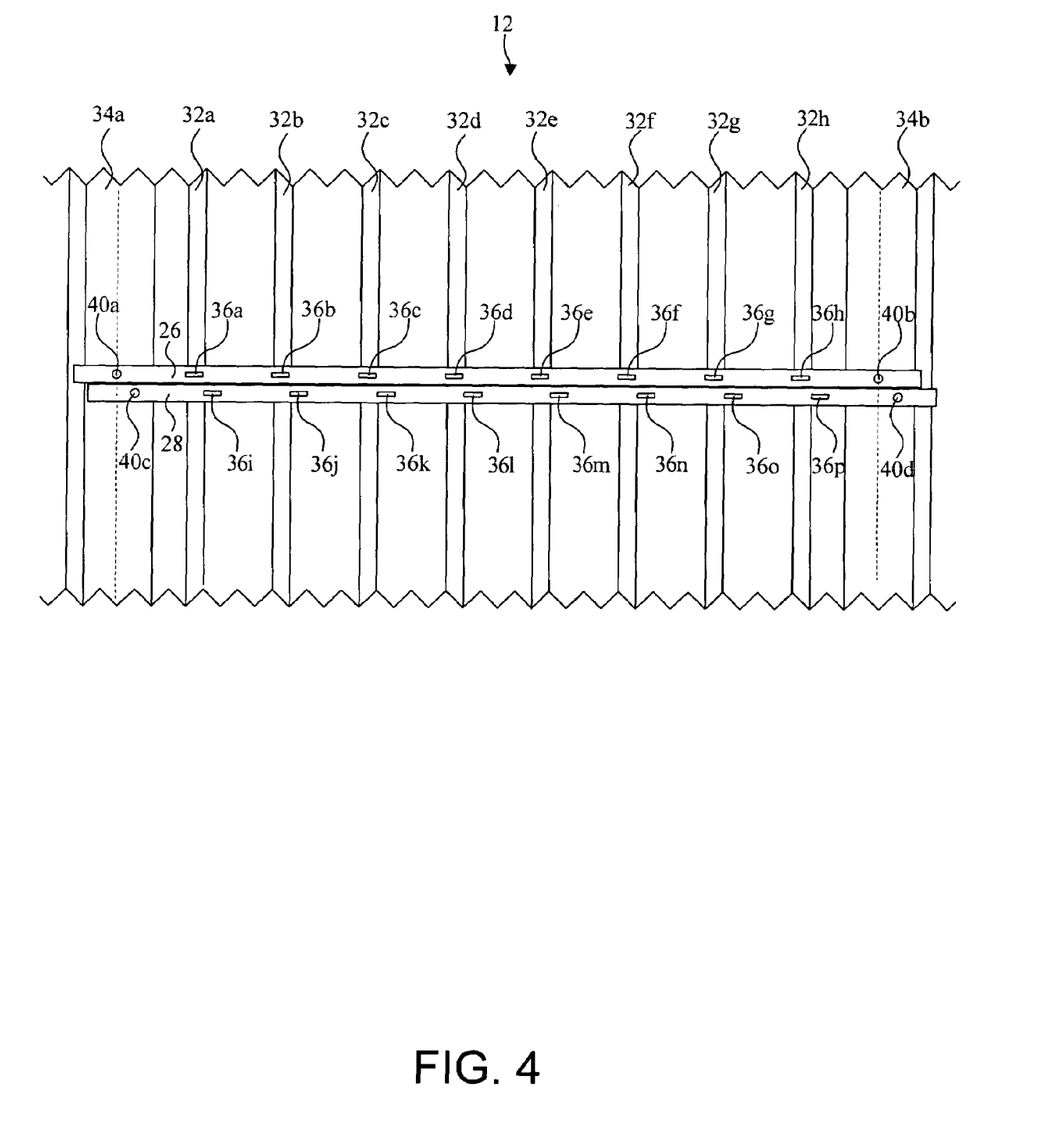
FIG. 4 is a schematic block diagram illustrating one embodiment of offset leading and trailing modules used to read and write data to a magnetic tape in a substantially unaltered state.

Referring to FIG. 4, for simplicity, only read elements 36 are illustrated to demonstrate the alignment of the read elements 36 with data tracks 32 on the tape 12. For example, if the dimensions of a tape 12 are substantially unaltered from when the tape was last written (e.g. not shrunk or expanded), then read elements 36a–h from a single leading or trailing module 26, 28 may be aligned with the data tracks 32a–h to read data therefrom. Servo readers 40a, 40b are used to center the leading or trailing module 26 over the data tracks 32ah by reading the servo tracks 34a, 34b. Thus, read elements 36a–h are aligned with or centered over the data tracks 32a–h. In this scenario, none of the read elements 36–p from the module 28 is used to read data from the data tracks 32a–h.

Figure 5:
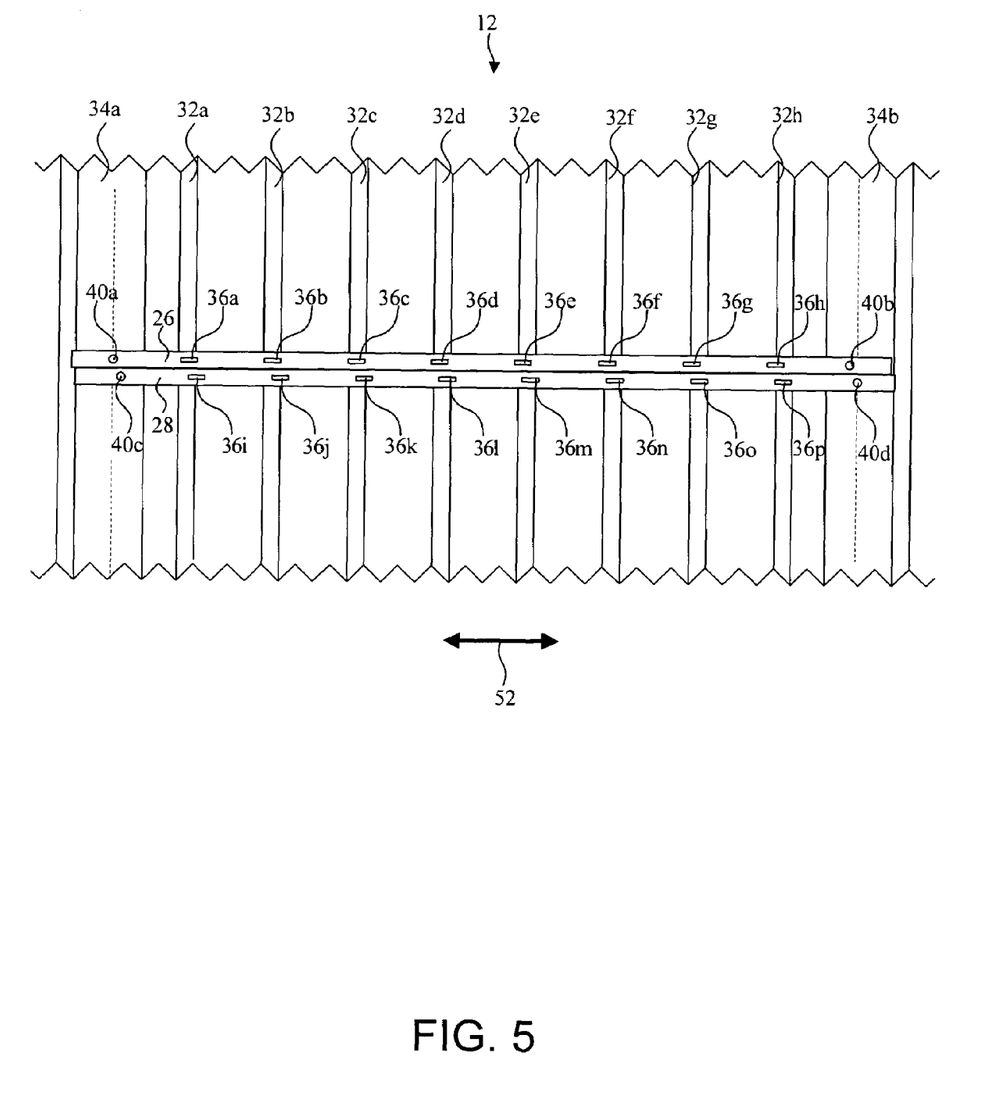
FIG. 5 is a schematic block diagram illustrating one embodiment of offset leading and trailing modules used to read from a magnetic tape in a substantially expanded state.

Referring to FIG. 5, in another embodiment, if the width of the tape 12 has expanded from the time the tape 12 was last written, in a direction 52, select read elements 36a–d from a leading module 26 are used to read data from selected data tracks 32a–d, while read elements 36m–p from the trailing module 28 are used to read other selected data tracks 32e–h. Since read elements 36a–h are offset with respect to read elements 36i–p, certain read elements 36a–d on the leading module 26 are more aligned with data tracks 32a–d than read elements 36i–l on the trailing module 28. Likewise, certain read elements 36m–p on the trailing module 28 are more aligned with data tracks 32e–h than other read elements 36e–h on the leading module 26. Thus, the offset of the trailing module 28 with respect to the leading module 26 provides for more accurate reading of data from the tape 12.

Figure 6:
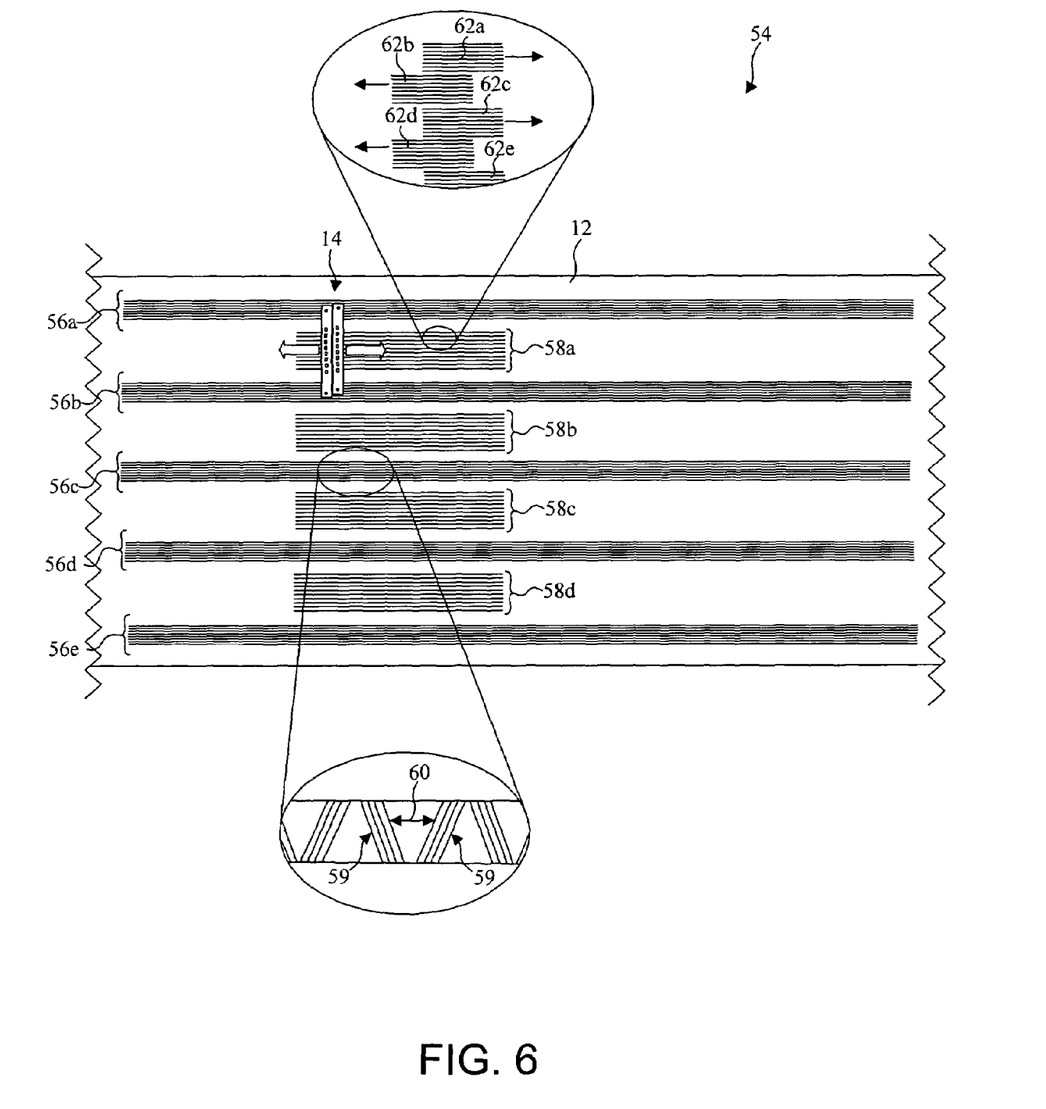
FIG. 6 is a schematic block diagram illustrating one example of a tape system, such as an LTO (Linear Tape-Open) system, in which a recording head in accordance with the invention may be used.

Referring to FIG. 6, in certain embodiments, an apparatus and method in accordance with the invention may be used in tape data storage systems, such as in an LTO (Linear Tape-Open) system 54. In such a system 54, multiple sets 56 of servo tracks and multiple sets 58 of data tracks are provided on a tape 12. Servo tracks 56 may include various reference tracks 59 that are angled with respect to one another. By measuring selected distances 60 between tracks 59, a servo system effectively aligns a recording head 14 with desired data tracks 58 on the tape 12.

In some cases, a set 56a of servo tracks define a plurality of positions of a recording head 14. For example, in an LTO system 54, a recording head 14 reads or writes eight data tracks simultaneously. However, sets 56a, 56b of servo tracks can be used to define any number of positions between the edges of the servo band 56. In LTO systems 54, twelve different positions of the head 14 are defined, thereby yielding a total of ninety-six data tracks 58a (12 positions multiplied by 8 data tracks) between servo tracks 56a, 56b. If four sets of data tracks 58a, 58b, 58c, 58d are provided, a tape 12 may store three hundred and eighty-four data tracks 58a–d (96 data tracks multiplied by 4 sets).

In addition, a recording head 14 may read or write data on the tape 12 in both directions. For example, a recording head 14 may read or write selected tracks 62a, 62c, 62e in a first direction, and read or write other selected tracks 62b, 62d in a second direction. By reading and writing in both directions, data may be written and read faster and with more efficiency.

Thus, a tape 12 may be very densely populated with data tracks 58. Under these circumstances, even a minute amount of tape shrinkage or expansion can cause misalignment of data tracks with the recording head 14, thereby incurring data loss or corruption. Thus, apparatus and methods in accordance with the invention enable more accurate storage and retrieval of data. An LTO system 54 simply represents one example of a system wherein apparatus and methods in accordance with the invention may be used. In reality, offsetting the leading and trailing module 26, 28 may be used in any tape system to compensate for tape shrinkage or expansion. Referring to FIGS. 7A–7D, a recording head 14 having offset leading and trailing modules 26, 28 may be characterized by a plurality of modes. For example, in selected embodiments, in cases where the dimensions of a tape 12 have expanded since last written, a first mode 64 shown in FIG. 7A uses read elements 72 from a first half of a leading module 26, and read elements 74 from a second half of the trailing module 28.

Figure 7A:
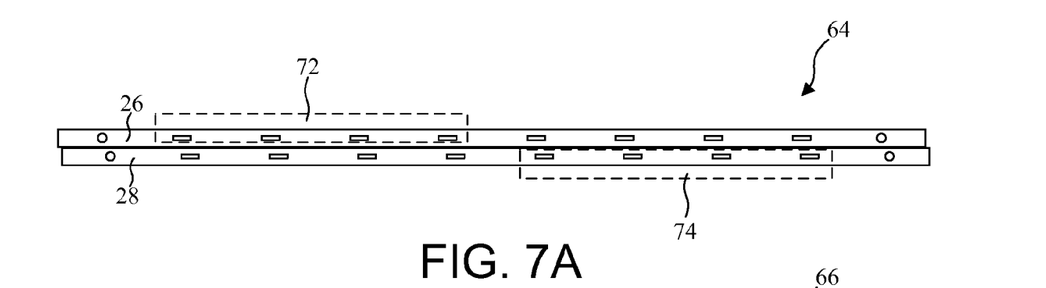
FIG. 7A is a schematic block diagram illustrating one embodiment of a first mode that may be used to read data tracks on expanded tape.
Figure 7B:
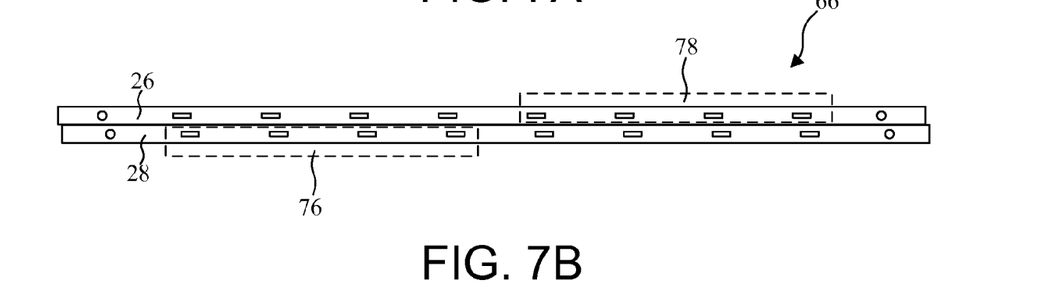
FIG. 7B is a schematic block diagram illustrating one embodiment of a second mode that may be used to read data tracks on shrunken tape.
Figure 7C:
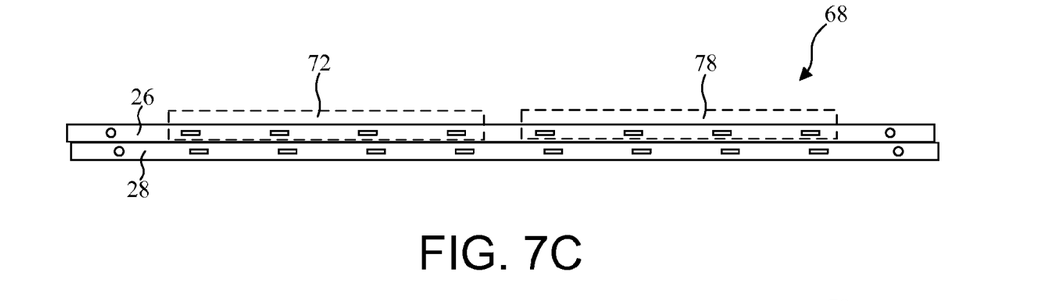
FIG. 7C is a schematic block diagram illustrating one embodiment of a third mode that may be used to read data tracks on unaltered tape.
Figure 7D:
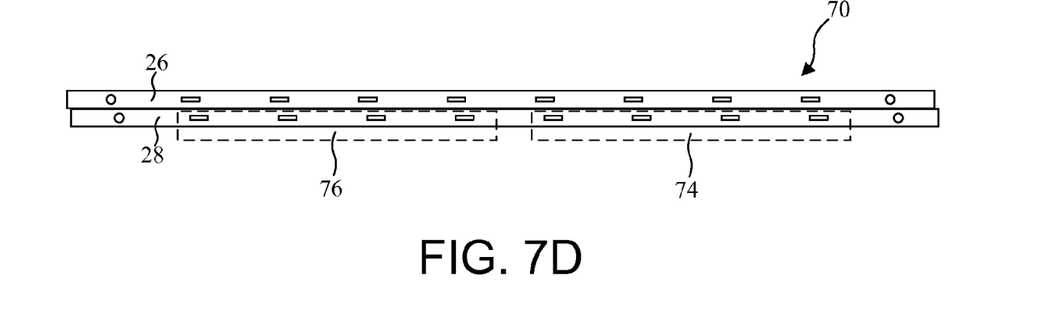
FIG. 7D is a schematic block diagram illustrating one embodiment of a fourth mode that may be used to read data tracks on unaltered tape.

Likewise, in cases where the dimensions of a tape 12 have contracted or shrunk since last written, a second mode 66 shown in FIG. 7B uses read elements 76 from a first half of the trailing module 28, and read elements 78 from a second half of the leading module 26. Similarly, if dimensions of a tape 12 have neither expanded nor contracted, a third mode 68 shown in FIG. 7C comprises read elements 72, 78 from both halves of a leading module 26. Substantially interchangeable with the third mode 68, a fourth mode 70 shown in FIG. 7D comprises read elements 76, 74 from both halves of a trailing module 28.

By dividing the leading and trailing modules 26, 28 into halves 72, 74, 76, 78, modes 64, 66, 68 corresponding to an expanded, shrunken, or a substantially unaltered state of the tape 12 are provided.

Figure 8A:
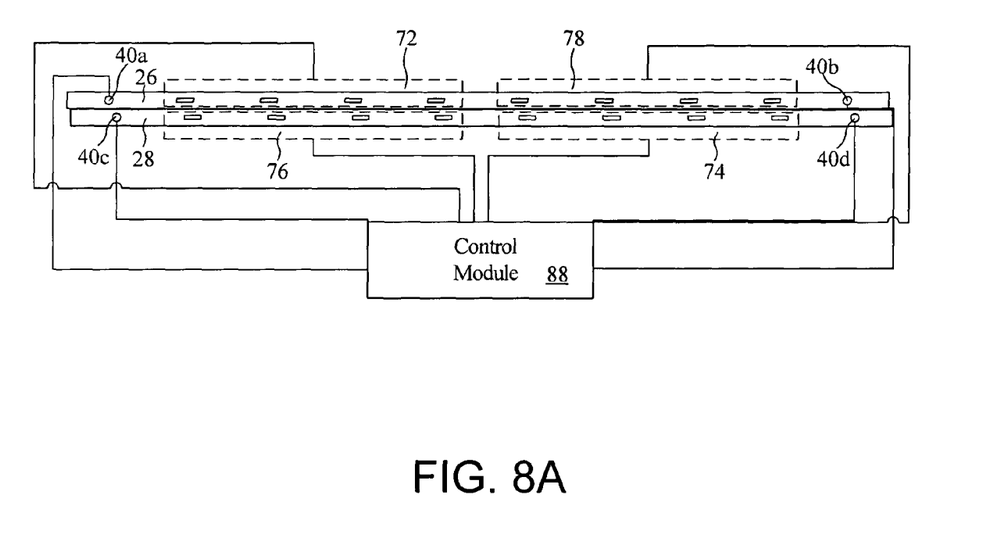
FIG. 8A is a schematic block diagram illustrating one embodiment of a control module used to control read and write elements from the leading and trailing modules.

Referring to FIG. 8A, in selected embodiments, a control module 88 is used to toggle between the different modes described with respect to FIG. 7. For example, a control module 88 may adjust and center the recording head 14 over the tape 12. The control module may also monitor or determine the width of the tape 12.

The control module 88 may receive input from servo readers 40a–d to center the recording head 14 over the tape 12, as well as to determine the width of the tape 12. In certain embodiments, the width of the tape 12, corresponding to when data was last written, may actually be read from the tape 12. That is, each time data is written to data tracks 32 on a tape 12, the width of the tape 12 is recorded or written onto the tape 12 for later retrieval upon reading of the data, or upon rewriting over the data. The width, when written, may then be compared to the width, when read, in order to select one of the three modes (e.g. wide, normal, or narrow) based on the difference.

In selected embodiments, another similar but simpler approach is to switch between the three modes and to choose the one with the smallest error rate. This could be done by either reading actual data stored on the tape 12 or could be accomplished using a special "test area" written onto the tape 12. In other embodiments, an apparatus and method in accordance with the invention could switch between the three modes only upon error recovery when reading data.

If a tape 12 has expanded, the servo readers 40 may sense this state due to their alignment with the servo tracks 34a, 34b on the tape 12. If expanded, the control module 88 selectively reads data using read elements 72, 74. If the tape 12 has shrunk, the control module 88 selectively reads data using read elements 76, 78. Likewise, if dimensions of the tape 12 are substantially unaltered, the control module 88 selects read elements 72, 78 from the leading module 26, or read elements 76, 74 from the trailing module 28.

Figure 8B:
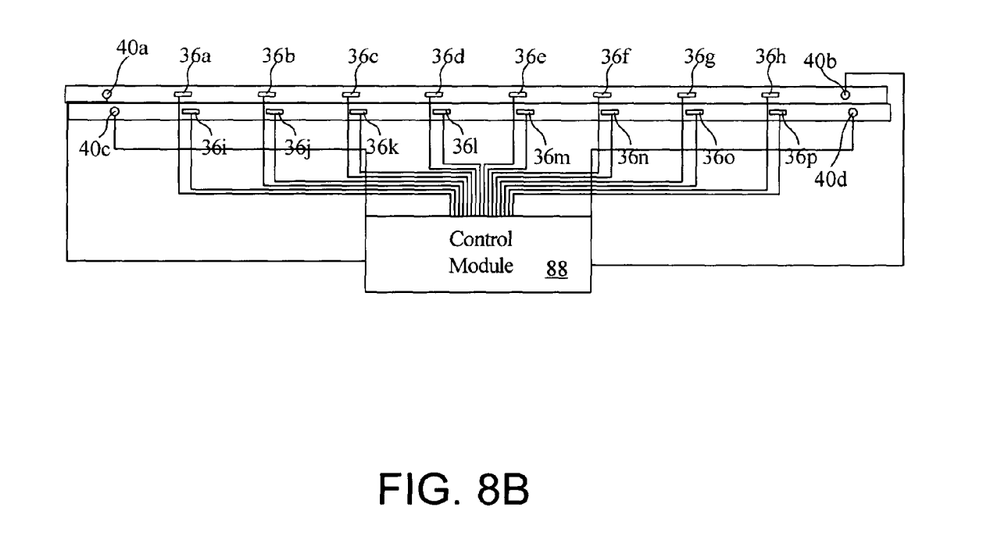
FIG. 8B is a schematic block diagram illustrating one embodiment of a control module used to control read and write elements from the leading and trailing modules individually.

Referring to FIG. 8B, the control module 88 need not read data from halves 72, 74, 76, 78 of the leading and trailing modules 26, 28, as illustrated in FIG. 8A. The control module may select read elements 36 that best align with the data tracks 32 as needed. This can be used advantageously where the expansion of the tape 12 is not uniform between the servo readers 40a, 40b. Data for determining which read elements 36a–p to select could come from monitoring signals from the read elements 36a–p as the head 14 is moved slightly back and forth over the tracks 32 in regions along the tape 12 written expressly for that purpose.

For example, in one contemplated embodiment, the control module 88 dynamically selects specific read elements 36a–p to read data from a tape 12. Various read elements 36a–h are used from the leading module 26, while others 36i–p are used from the trailing module 28. The read elements 36 may be selected in any combination, as needed, and may be those that best align with data tracks 32 present on the tape 12. The control module 88 may also optimize centering of the leading and trailing modules 26, 28 over the data tracks 32 using the servo readers 40a–d.

Figure 9:
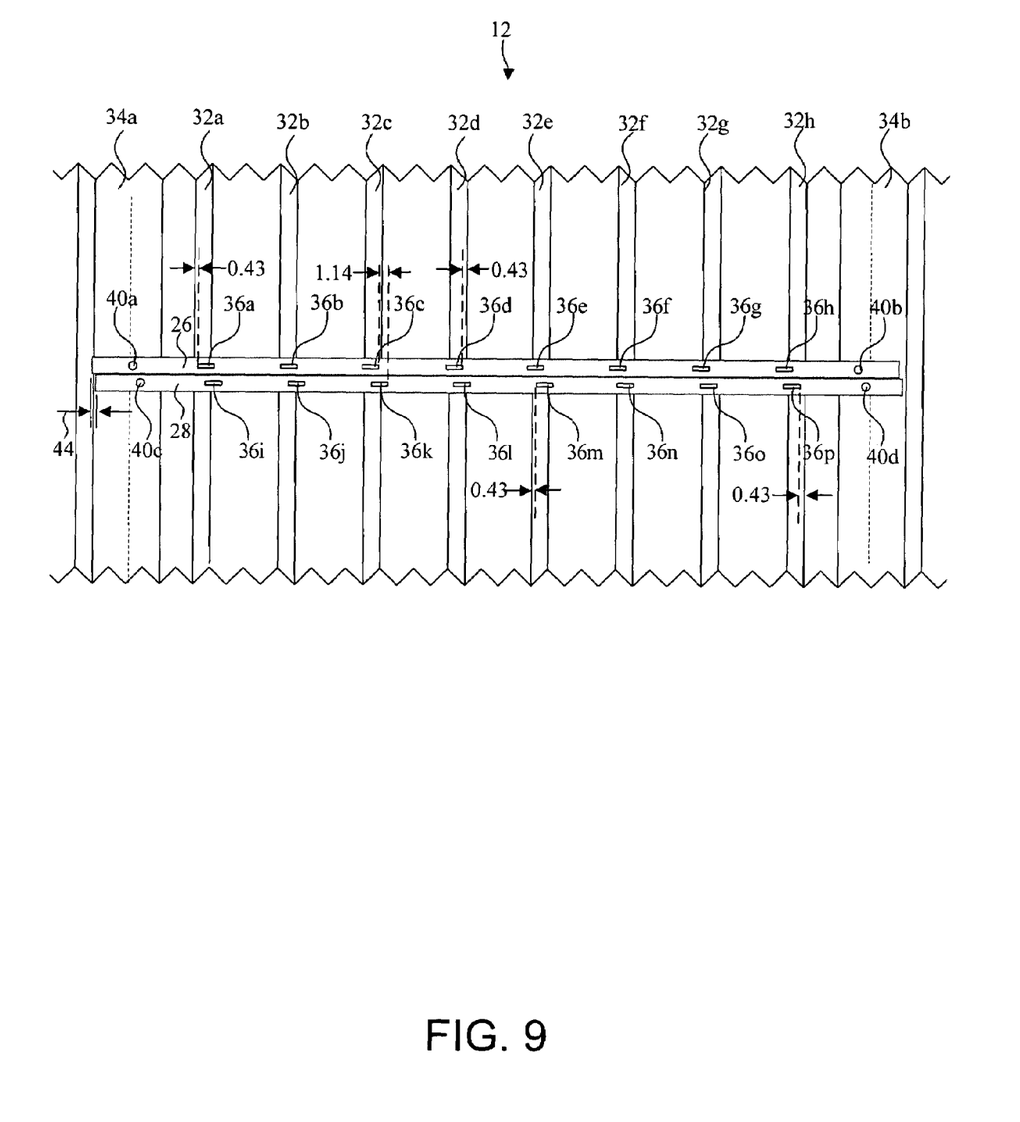
FIG. 9 is a schematic block diagram illustrating one embodiment of the alignment of the read elements with data tracks on an expanded tape.

Referring to FIG. 9, the distance 44 the trailing module 28 is shifted with respect to the leading module 26 is important since the offset 44 may be fixed at the time of manufacture of the head 14. The operating environment may set limits on the amount the tape 12 can expand or contract between outer elements 36a, 36p of the read head 14 and still remain operable. For example, if the limit for tape expansion is 2 microns between the outer two data tracks 32a, 32h, as is illustrated in this example, and where one is reading over half of the head 14 width, as enabled by this disclosure, the servos 40 can center the read elements 36 such that the worst-case misalignment is 0.43 micron if the shift 44 between modules is 1.14 microns.

In selected embodiments, an optimum offset 44 between the leading and trailing modules 26, 28 may be calculated to be approximately 57% of the maximum amount of shrinkage or expansion of a tape 12. That is, if it is determined that a tape 12 may shrink or expand by a maximum of 2 microns, the optimum offset 44 for the leading and trailing modules 26, 28 may be 1.14 microns. Nevertheless, any nonzero offset 44 between the leading and trailing modules 26, 28 is within the scope of the present invention.

The present invention may be embodied in other specific forms without departing from its essence or essential characteristics. The described embodiments are to be considered in all respects only as illustrative, and not restrictive. The scope of the invention is, therefore, indicated by the appended claims, rather than by the foregoing description.

All changes within the meaning and range of equivalency of the claims are to be embraced within their scope.

What is claimed and desired to be secured by United States Letters Patent is:

1. A recording/reproducing head to read from a plurality of tracks on magnetic tape while compensating for shrinkage or expansion of the magnetic tape, the recording/reproducing head comprising:
    a leading module comprising a plurality of leading read elements located at spaced intervals along the length of the leading module;
    a trailing module comprising a plurality of trailing read elements located at spaced intervals along the length of the trailing module; and
    the trailing module being offset with respect to the leading module, such that:
    selected leading read elements are substantially aligned with and read first selected tracks from the plurality of tracks, and
    selected trailing read elements are concurrently substantially aligned with and read second selected tracks from the plurality of tracks that are distinct from the first selected tracks.

2. The recording/reproducing head of claim 1, wherein the trailing module is fixed with respect to the leading module.

3. The recording/reproducing head of claim 2, wherein the trailing module is rigidly attached to the leading module.

4. The recording/reproducing head of claim 1, wherein the trailing module is substantially identical to the leading module.

5. The recording/reproducing head of claim 1, further comprising a plurality of leading write elements, on the leading module, and a plurality of trailing write elements, on the trailing module.

6. The recording/reproducing head of claim 1, further comprising a plurality of servos configured to substantially align selected leading and trailing read elements with the plurality of tracks.

7. The recording/reproducing head of claim 6, wherein the plurality of servos align the selected leading and trailing read elements using servo tracks on the magnetic tape.

8. The recording/reproducing head of claim 6, wherein the servos effectively measure the width of the magnetic tape between servo bands on the tape.

9. The recording/reproducing head of claim 1, further comprising a controller configured to select the selected leading read elements and the selected trailing read elements.

10. The recording/reproducing head of claim 1, wherein the leading and trailing modules are offset an amount in the range of between 37% and 77% of a calculated maximum shrinkage and expansion of the magnetic tape.

11. A method for reading data from a plurality of tracks on magnetic tape while compensating for shrinkage or expansion of the magnetic tape, the method comprising:
    providing a leading module comprising a plurality of leading read elements located at spaced intervals along the length of the leading module;
    providing a trailing module comprising a plurality of trailing read elements located at spaced intervals along the length of the trailing module;
    offsetting the trailing module with respect to the leading module;
    aligning selected leading read elements with first selected tracks from the plurality of tracks, wherein the selected leading read elements read the first selected tracks; and
    concurrently aligning selected trailing read elements with other second selected tracks from the plurality of tracks that are distinct from the first selected tracks, wherein the selected leading trailing elements read the second selected tracks.

12. The method of claim 11, further comprising fixing the trailing module with respect to the leading module.

13. The method of claim 12, further comprising rigidly attaching the trailing module to the leading module.

14. The method of claim 11, wherein the trailing module is substantially identical to the leading module.

15. The method of claim 11, further comprising providing a plurality of leading write elements, on the leading module, and a plurality of trailing write elements, on the trailing module.

16. The method of claim 11, further comprising substantially aligning selected leading and trailing read elements with the plurality of tracks using a plurality of servos.

17. The method of claim 16, wherein substantially aligning further comprises aligning the selected leading and trailing read elements using servo tracks on the magnetic tape.

18. The method of claim 16, wherein substantially aligning further comprises effectively measuring, with the servos, the width of the magnetic tape between servo bands on the magnetic tape.

19. A system for reading data from a plurality of tracks on magnetic tape while compensating for shrinkage or expansion of the magnetic tape, the system comprising:
    a magnetic medium including a plurality of data tracks located at spaced intervals along the magnetic medium; and
    a data storage device including a recording/reproducing head for reading and writing to and from the data tracks, the recording/reproducing head comprising:
    a leading module comprising a plurality of leading read elements located at spaced intervals along the length of the leading module;
    a trailing module comprising a plurality of trailing read elements located at spaced intervals along the length of the trailing module; and
    the trailing module, being offset with respect to the leading module such that selected leading read elements align with and read first selected tracks and selected trailing read elements effectively concurrently align with and read second selected tracks that are distinct from the first selected tracks.

20. A recording/reproducing head to read from a plurality of tracks on magnetic tape while compensating for shrinkage or expansion of the magnetic tape, the recording/reproducing head comprising:
    means for providing a plurality of leading read elements, at spaced intervals, in a substantially linear arrangement;
    means for providing a plurality of trailing read elements, at spaced intervals, in a substantially linear arrangement; and
    means for offsetting the leading read elements with respect to the trailing read elements such that the leading read elements concurrently align with and read first selected tracks and the trailing read elements align with and read second selected tracks that are distinct from the first selected tracks.

21. A method for reading data from a plurality of tracks on magnetic tape while compensating for shrinkage or expansion of the magnetic tape, the method comprising:

providing a plurality of leading read elements spaced substantially linearly with respect to one another and at predetermined intervals;

providing a plurality of trailing read elements spaced substantially linearly with respect to one another and at predetermined intervals, the spacing of the trailing read elements being substantially equal to the spacing of the leading read elements;

offsetting the leading read elements with respect to the trailing read elements;

reading first selected tracks from the plurality of tracks with selected leading read elements; and concurrently reading other second selected tracks from the plurality of tracks that are distinct from the first selected tracks with selected trailing read elements.

* * * * *